United States Patent [19]

Boussuges

[11] 4,295,782
[45] Oct. 20, 1981

[54] STARTING OF PUMPS OR TURBOPUMPS

[75] Inventor: Pierre Boussuges, Grenoble, France

[73] Assignee: Neyrpic, Grenoble, France

[21] Appl. No.: 86,675

[22] Filed: Oct. 19, 1979

[30] Foreign Application Priority Data

Oct. 20, 1978 [FR] France ............................. 78 29899

[51] Int. Cl.³ .............................................. F03B 3/10
[52] U.S. Cl. ........................................ 415/1; 415/500
[58] Field of Search .................................... 415/1, 500

[56] References Cited

U.S. PATENT DOCUMENTS

| | | | |
|---|---|---|---|
| 3,309,057 | 3/1967 | Tonooka | 415/1 |
| 3,682,563 | 8/1972 | Takashima | 415/1 |
| 4,014,624 | 3/1977 | Takase et al. | 415/1 |
| 4,073,594 | 2/1978 | Takagi et al. | 415/1 |
| 4,158,525 | 6/1979 | Kawase et al. | 415/500 |

Primary Examiner—Louis J. Casaregola
Attorney, Agent, or Firm—Haseltine and Lake

[57] ABSTRACT

Method of starting pumps, in particular a method of starting turbopumps functioning as pumps, the said pumps or turbopumps being of the type with a fixed distributor-diffuser, and in which the curve of variation of the power at working speed as a function of the flow of fluid passes through a minimum which is between the zero-flow point and the nominal-flow point.

In conformance with the invention, the method is characterized by a sequence consisting of putting in rotation, at a lower speed than the nominal speed, the pump-motor, the guard valve or valves being closed; when the pressures either side of the guard valve or valves have reached a differential value which is either zero or sufficiently low for its/their opening to be effectible without risk of damage, of opening these or this to such an extent that it/they allow, when the unit approaches its nominal speed, the flow corresponding to the said minimum and finally of progressively opening the guard valve or valves until it/they allow the nominal flow to pass.

2 Claims, 1 Drawing Figure

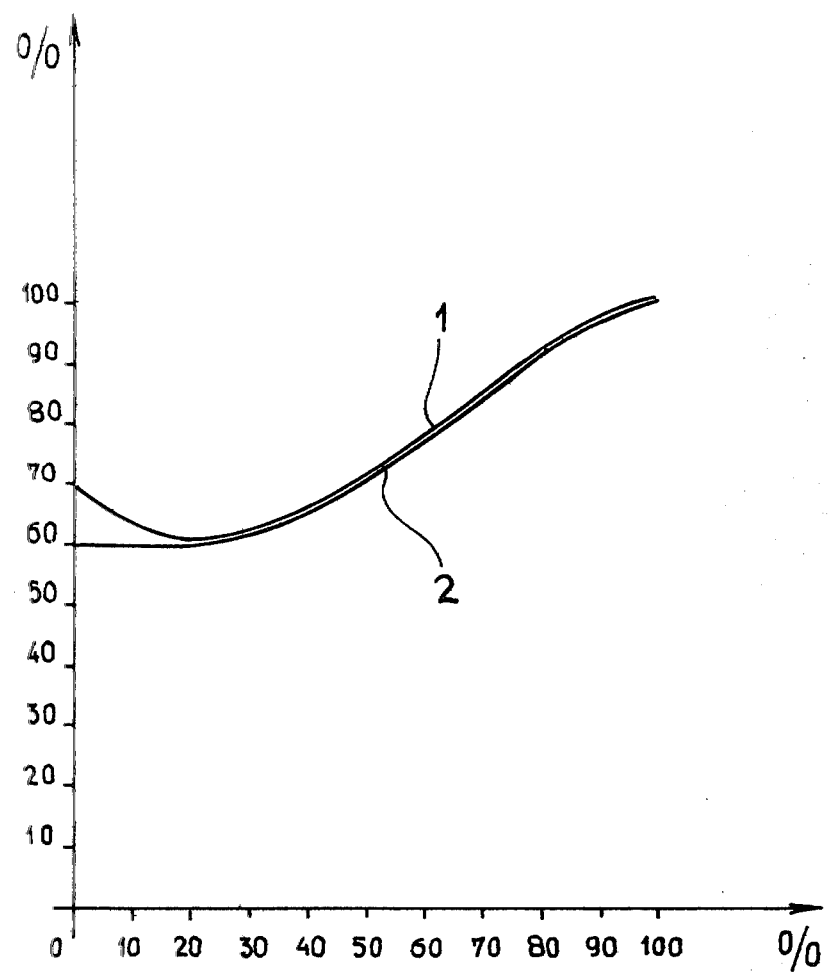

STARTING OF PUMPS OR TURBOPUMPS

FIELD OF THE INVENTION

The present invention concerns the starting of pumps and more particularly the starting of turbopumps functioning as pumps, the said pumps or turbopumps being of the type with a fixed distributordiffuser.

BACKGROUND

The starting of pumps or turbopumps functioning as pumps must generally be carried out with drowned wheels to avoid a fierce intake of current at the moment the pump is primed, which causes surges in the electrical power distribution system. For example, in the case of starting turbopumps functioning as pumps, and when, as is the case for the pumps of the invention, a turbopump with fixed distributor is involved, the conventional starting sequence, with the guard valve closed, consists in starting the pump, either by means of an auxiliary synchronous motor, or by means of its synchronous motor then operating, thanks to special equipment such as "dampers", or to an oversizing of armature windings, as an asynchronous motor. The speed is then progressively increased until it reaches the synchronous speed. Then the synchronous motor is coupled and the guard valve progressively opened until nominal flow is obtained. The zero-flow power supplied near synchronous speed, called "bubbling power", is often a nonnegligible fraction of the nominal power, and can reach 70% of the latter. From this results on the one hand a heating of the zero-flow water which, through a differential expansion of certain turbine-parts, among fixed parts and movable parts, can lead to damage to some of these parts, and on the other hand a need for overdesigning of the motor used for starting, whether this is an auxiliary motor, the principal turbopump motor or the principal asynchronous motor of the pump, if a conventional pump is involved. Now, it has been established that the Power-Flow characteristic at nominal speed of a pump or turbopump functioning as a pump very often passes through a minimum situated between the zero-flow point and the nominal-flow point. This minimum, generally to be found at a flow of 10 to 20% of the nominal flow, is generally about 15% less than bubbling power at zero flow.

SUMMARY OF THE INVENTION

The method of starting a pump according to the invention allows bubbling power to be satisfactorily decreased and consequently starting is achieved without the aforesaid difficulties arising; it is characterised by the use of the following sequence:
putting into rotation, at a speed lower than nominal speed, of the pump-motor, with the guard valve or valves closed,
when the pressures either side of the said guard valve or valves have reached a differential value which is either zero or sufficiently low for its/their opening to be effectible without risk of damage, opening of this or these to such an extent that it/they allow, when the unit approaches its nominal speed, the flow corresponding to the said minimum of the curve of power-flow at nominal speed to pass,
progressive opening of the said guard valve or valves until it/they allow the nominal flow to pass.

In addition, in the case of the pump or turbopump being driven by an alternator-motor, or by a motor working normally as a synchronous motor, the latter is synchronized when the flow corresponding to the said minimum of the Power-Flow characteristic is reached.

BRIEF DESCRIPTION OF THE DRAWING

In the single FIGURE attached, Curve 1 represents, in relative values expressed as percentages of nominal values, the variation of power as a function of flow, for the speed of synchronism and in normal conditions for starting a conventional turbopump. Curve 2 represents the same variation when the method according to the invention is used.

DETAILED DESCRIPTION

It is seen that Curve 1, which, at zero flow, reaches the value of 70% of nominal power, passes through a minimum of about 60% of the said nominal power for a flow-value of about 20%. The method according to the invention, consisting in opening the valves so as to cause them to allow through the flow corresponding to the minimum (60% in power, 20% in flow) of the curve when pressures permit, allows a change to Curve 2, that is to say, a decrease in bubbling power of about 10%.

To implement the method according to the invention, the most varied apparatuses allowing the required opening can be used. For example, a guard valve can be used, provided with a regulated "by-pass" to allow through, once it is open, the said flow corresponding to the said minimum of the curve. However, in the case of large flow and considerable loads, such a by-pass is bulky and expensive. The applicant has found that it is particularly advantageous, in the application of the method according to the invention, to use a spherical guard valve such as that described in his French Pat. No. 73.02272, published under the number 2.215.097. Thus in the first place it is actually possible to obtain a turbopump which is provided with such a valve so that it can operate as a turbine, and which is totally reversible, through the use of this valve, so that it can operate as a pump and, in the second place and most significantly, whether a turbopump or an ordinary pump with an asynchronous motor is being used, such a valve, because it has a long and regulable lift, allows an optimal servo-control of the speed of rotation of the motor of the pump at the required flow.

The invention can be used in the field of hydraulic pumps and in particular in that of turbopumps used in hydraulic plant intended for electric power supply.

I claim:
1. A method of starting pumps with immersed wheels, said pumps being of the type with a fixed distributor-diffuser, and according to which the curve of variation of the power at working speed as a function of the flow of fluid passes through a minimum which is between the zero-flow point and the operating point, wherein the method comprises the following sequence:
putting the pumps into rotation, at a speed lower than operating speed of the motor of the pump with a flow valve closed,
when the pressure on either side of the said flow valve has reached a differential value which is sufficiently low for its opening to be effected without risk of damage, opening said flow valve to such an extent that it allows, when the unit approaches its operating speed, the flow corresponding to the said minimum of the curve of power-flow at operating speed, and progressively opening of said flow valve until it allows the operating flow to pass.

2. A method of starting pumps according to claim 1, applied in the instance of the pump being driven by a motor operating as a synchronous motor, whereby the latter is synchronized when the flow corresponding to a minimum of a power flow characteristic is reached.

* * * * *